United States Patent
Negishi

(10) Patent No.: US 8,744,625 B2
(45) Date of Patent: Jun. 3, 2014

(54) ROBOT CONTROLLING DEVICE

(75) Inventor: Mahito Negishi, Tachikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 249 days.

(21) Appl. No.: 13/269,215

(22) Filed: Oct. 7, 2011

(65) Prior Publication Data

US 2012/0116582 A1 May 10, 2012

(30) Foreign Application Priority Data

Nov. 5, 2010 (JP) ................................ 2010-248187

(51) Int. Cl.
*B25J 9/06* (2006.01)

(52) U.S. Cl.
USPC ........... 700/245; 700/254; 700/248; 700/249; 700/252; 345/156

(58) Field of Classification Search
USPC .................................. 700/245, 254; 900/1, 2
See application file for complete search history.

(56) References Cited

U.S. PATENT DOCUMENTS

| | | | |
|---|---|---|---|
| 6,442,451 B1 | 8/2002 | Lapham | |
| 6,987,504 B2* | 1/2006 | Rosenberg et al. | 345/156 |
| 7,061,467 B2* | 6/2006 | Rosenberg | 345/156 |
| 7,591,171 B2* | 9/2009 | Negishi | 73/105 |
| 7,657,345 B2* | 2/2010 | Endo et al. | 700/249 |
| 7,865,266 B2* | 1/2011 | Moll et al. | 700/245 |
| 7,915,787 B2* | 3/2011 | Negishi et al. | 310/323.02 |
| 8,504,206 B2* | 8/2013 | Fudaba et al. | 700/260 |
| 2006/0276934 A1 | 12/2006 | Nihei et al. | |
| 2009/0300806 A1* | 12/2009 | Negishi | 850/33 |
| 2009/0306931 A1* | 12/2009 | Negishi | 702/167 |
| 2010/0023164 A1* | 1/2010 | Yoshizawa | 700/252 |
| 2010/0217438 A1* | 8/2010 | Kawaguchi et al. | 700/248 |
| 2010/0287556 A1 | 11/2010 | Munz | |
| 2011/0015785 A1* | 1/2011 | Tsusaka et al. | 700/254 |

(Continued)

FOREIGN PATENT DOCUMENTS

| | | | |
|---|---|---|---|
| CN | 1279140 A | 1/2001 | |
| CN | 1484807 A | 3/2004 | |
| CN | 1876334 A | 12/2006 | |
| JP | 08-328628 A | 12/1996 | |
| JP | 2004-524171 | 8/2004 | ............... B25J 13/00 |

(Continued)

OTHER PUBLICATIONS

"Robot Engineering Handbook edited by the Robotics Society of Japan", published by Corona Publishing Co., Ltd., Tokyo, Japan 2005, with partial English-language translation.

(Continued)

*Primary Examiner* — Thomas Black
*Assistant Examiner* — Wae Louie
(74) *Attorney, Agent, or Firm* — Fitzpatrick, Cella, Harper & Scinto

(57) ABSTRACT

In the control of a multi-joint robot main body, it is necessary to execute intricate track calculations and synchronous operations in parallel, even if the track calculations are intricate and times required for the calculations are indefinite. For this purpose, a robot controlling device of the present invention includes a shared memory, and first and second processing units connected to the shared memory. The first processing unit performs track calculation processing which includes calculating operation command data indicating a series of command values to be output to arm motors, based on a command to operate the multi-joint robot main body to a desired position posture, and storing the calculated operation command data in the shared memory. The second processing unit performs synchronous processing which includes acquiring the operation command data stored in the shared memory, and synchronously outputting the command values to the arm motors at predetermined time intervals.

7 Claims, 13 Drawing Sheets

(56) References Cited

U.S. PATENT DOCUMENTS

| | | | |
|---|---|---|---|
| 2011/0178638 A1* | 7/2011 | Tsusaka et al. | 700/257 |
| 2012/0116582 A1* | 5/2012 | Negishi | 700/245 |
| 2012/0191245 A1* | 7/2012 | Fudaba et al. | 700/254 |
| 2012/0277909 A1* | 11/2012 | Ouchi | 700/254 |
| 2013/0184868 A1* | 7/2013 | Inazumi | 700/260 |

FOREIGN PATENT DOCUMENTS

| | | | |
|---|---|---|---|
| WO | 02054329 | 7/2002 | G06F 19/00 |
| WO | 20091090164 A | 7/2009 | |

OTHER PUBLICATIONS

Yoshikawa, "Current Status and Future Status of the Power Control for Robot", Journal of the Robotics Society of Japan, vol. 9, No. 6 (1991) pp. 746-750.

Kosuge, "Classification of the Power Control Method and Design Method of the Control System", Journal of the Robotics Society of Japan, vol. 9, No. 6 (1991), pp. 751-758.

D.E. Whitney, "Historical Perspective and State of the Art in Robot Force Control", Proc. 1985 IEEE Conference on Robotics and Automation (1985) pp. 262-268.

Website, Fanuc Corporation, http://www.fanuc.co.jp (last accessed on Mar. 30, 2012).

J.E. Bobrow, et al., "Time-Optimal Control of Robotic Manipulators Along Specified Paths", The International Journal of Robotics Research, vol. 4, No. 3, Fall 1985, pp. 3 to 17.

"Robot Engineering Handbook", edited by the Robotics Society of Japan, published by Corona Publishing Co., Ltd., Tokyo, Japan 2005. 287 pages.

Chinese Office Action dated Dec. 20, 2013 for corresponding Chinese Appln No. 201110339526.9.

* cited by examiner

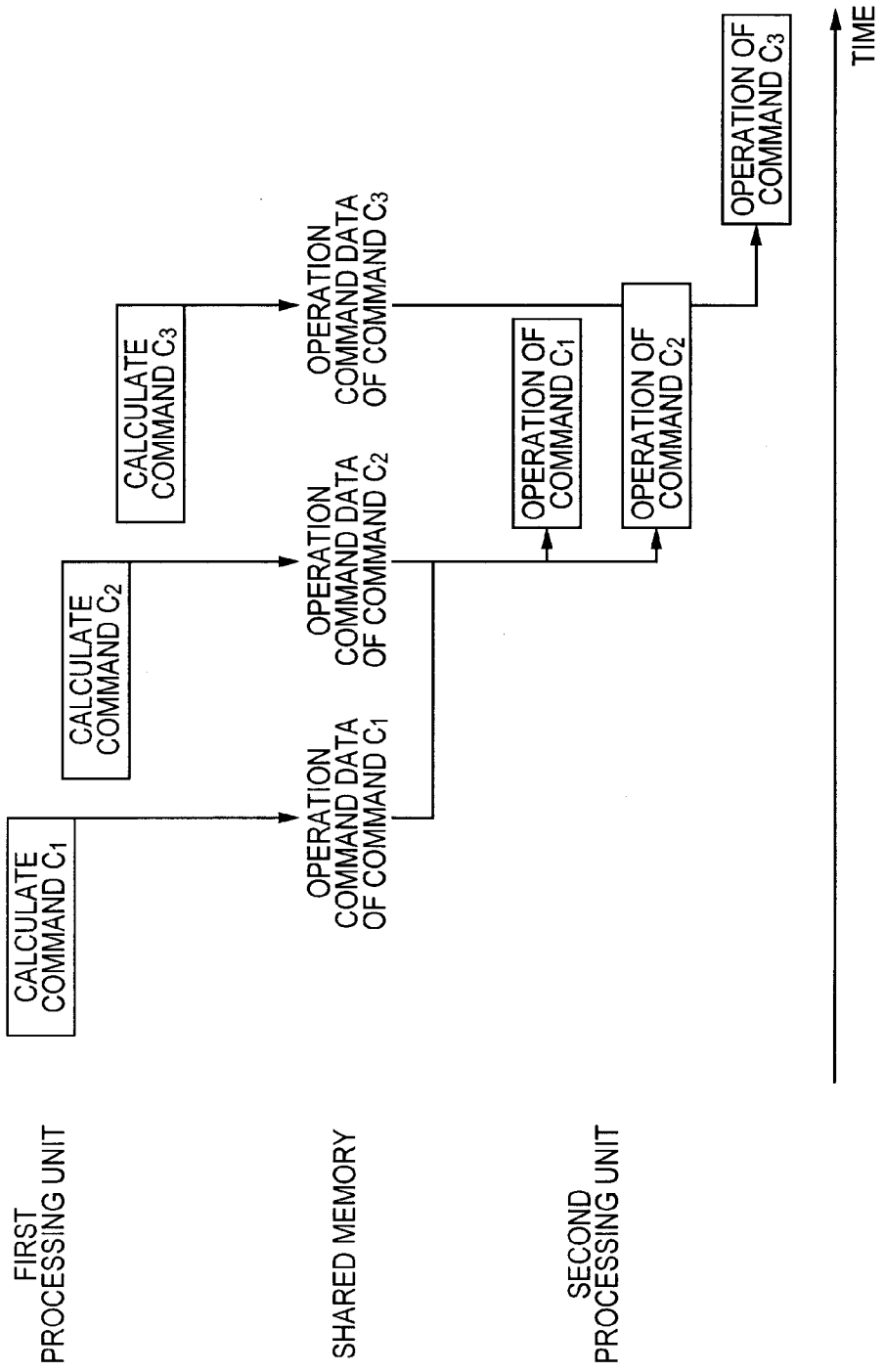

ROBOT CONTROLLING DEVICE

BACKGROUND OF THE INVENTION

1. Field of the Invention

The present invention relates to a robot controlling device which controls a plurality of driving units which drive joints of a multi-joint robot main body.

2. Description of the Related Art

In a multi-axial multi-joint robot main body, it is necessary to operate the main body while synchronously changing angles of joints. If these joint angles are not synchronously changed, a track of an end point position of the multi-joint robot main body shifts. Therefore, a robot controlling device synchronously controls a plurality of driving units which drive the respective joints of the multi-joint robot main body (see JP-A-2004-524171 (Japanese Translation of PCT International Application)). It is to be noted that the calculation of each joint angle from a desired position posture of the multi-joint robot main body is called an inverse problem. Conversely, the calculation of the position posture of the multi-joint robot main body from the respective joint angles is called a forward problem. A field which handles these problems is called mechanics.

This conventional robot controlling device has a constitution in which two computers having different properties are combined. One of the computers is a general purpose computer, and the other computer is a real time computer. Moreover, the general purpose computer outputs, to the real time computer, a command indicating the desired position posture of the multi-joint robot main body. The real time computer can calculate operation command data where command values each indicating the joint angle of each driving unit are arranged in time series, on the basis of the input command based on inverse kinematics.

When the respective driving units are operated securely on schedule, it is necessary to synchronously output the calculated command values to the respective driving units of the multi-joint robot main body at predetermined time intervals (e.g. 5 ms).

However, the conventional robot controlling device cannot allow the multi-joint robot main body to perform any humanly dextrous operation. Specifically, a very high-level intricate algorithm is hidden in the humanly dextrous operation, and a robot control system has to perform calculations based on the high-level intricate algorithm. Moreover, even when the desired position posture of the multi-joint robot main body is simple, each joint angle of the multi-joint robot main body draws an intricate track. That is, calculation processing based on the inverse kinematics is intricate and requires much time as compared with calculation processing based on forward kinematics.

Therefore, when such intricate track calculations are performed, times required for the calculations become longer than synchronous times (time intervals to output the command values) sometimes. Moreover, the required times change often in accordance with calculation conditions. That is, the times required for the track calculations are indefinite. As the required time, there is supposed time of, for example, 1 s which is incomparably longer than the synchronous time (e.g. 5 ms).

However, in the robot controlling device disclosed in JP-A-2004-524171, it is necessary for the real time computer to execute intricate track calculations and synchronous operations in parallel. Therefore, the real time computer has to complete the track calculations within the synchronous times, but the times required for the track calculations are indefinite, so that the track calculations are not completed within the synchronous times sometimes. In such a case, it is necessary for the real time computer to perform the synchronous operations after completing all the track calculations, and the operation of the multi-joint robot main body has to be stopped until the track calculations end. In consequence, the multi-joint robot main body cannot perform any smooth operation, and the humanly dextrous operation cannot be realized.

To solve the problems, an object of the present invention is to provide a robot controlling device which can execute intricate track calculations and synchronous operations in parallel, even if the track calculations are intricate and times required for the calculations are indefinite.

SUMMARY OF THE INVENTION

According to the present invention, there is provided a robot controlling device which outputs a command value of a joint angle to each of a plurality of driving units which drive joints of a multi-joint robot main body, to control driving operations of the respective driving units, the robot controlling device comprising: a shared memory; and a first processing unit and a second processing unit accessibly connected to the shared memory, wherein the first processing unit performs track calculation processing which includes calculating operation command data indicating a series of command values to be output to the respective driving units, on the basis of a command to operate the multi-joint robot main body to a desired position posture, and storing the operation command data as calculation results in the shared memory, and the second processing unit performs synchronous processing which includes acquiring the operation command data stored in the shared memory, and synchronously outputting the command values to the respective driving units at predetermined time intervals.

According to the present invention, since the track calculation processing is performed by the first processing unit to store the operation command data as the calculation results in the shared memory, the second processing unit does not have to perform any intricate track calculation processing. Moreover, since the second processing unit does not perform any intricate track calculation processing, it is possible to realize the synchronous processing which includes synchronously outputting, to the respective driving units, the command values of the operation command data already calculated by the first processing unit, without stopping the operation of the multi-joint robot main body. Therefore, the multi-joint robot main body can perform a humanly dextrous operation.

Further features of the present invention will become apparent from the following description of exemplary embodiments with reference to the attached drawings.

BRIEF DESCRIPTION OF THE DRAWINGS

FIG. 6 is a time chart illustrating an operation example which uses three commands.

DESCRIPTION OF THE EMBODIMENTS

[First Embodiment]

Figure 1:
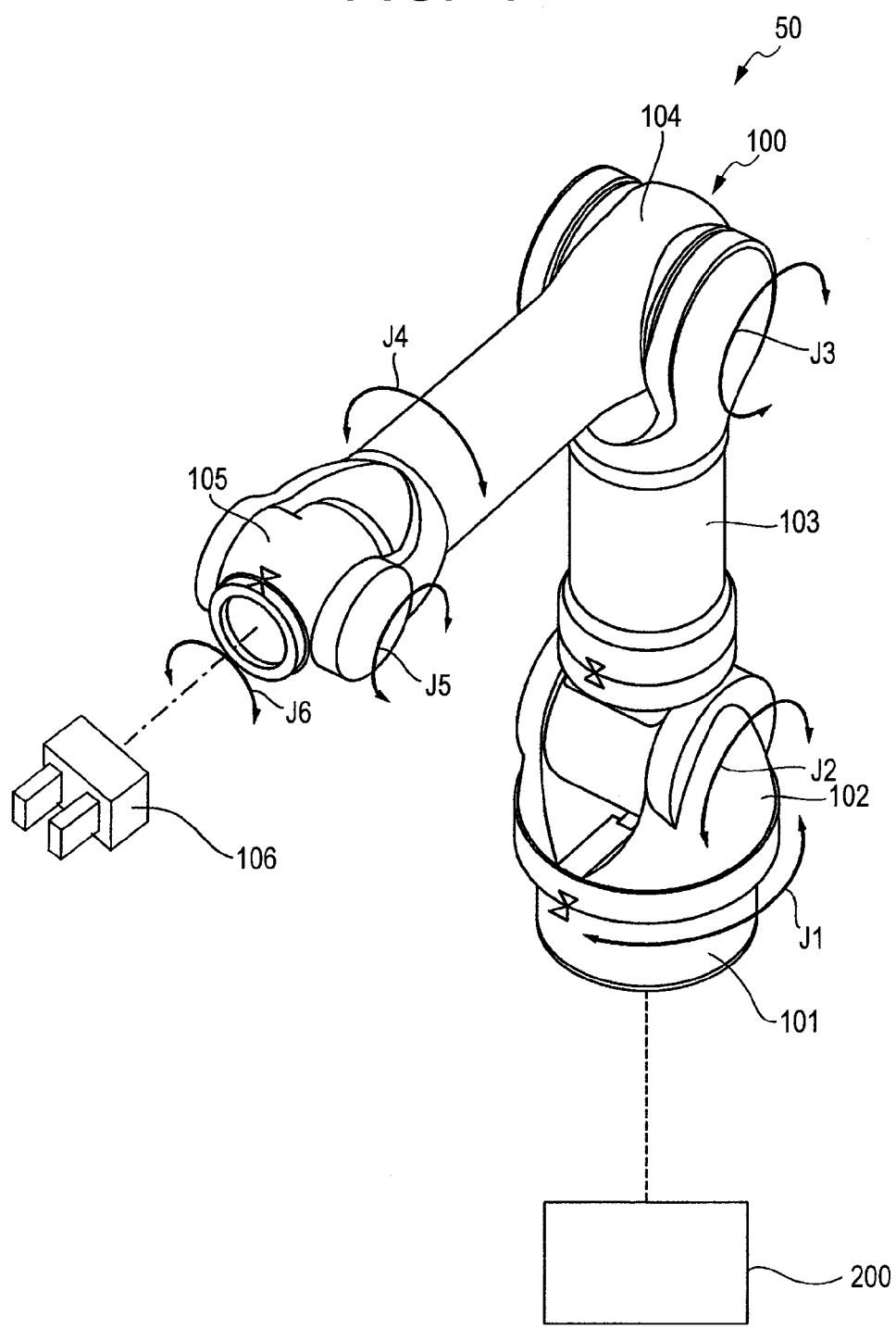
FIG. 1 is an explanatory view illustrating a schematic constitution of a robot apparatus according to a first embodiment of the present invention.

FIG. 1 is an explanatory view illustrating a schematic constitution of a robot apparatus according to a first embodiment of the present invention. A robot apparatus 50 includes a multi-joint robot main body 100, and a robot controlling device 200 which controls the multi-joint robot main body 100.

The multi-joint robot main body 100 includes a plurality of links 101 to 105, and a hand 106 which is an end effector connected to the tip link 105, and the links 101 to 105 and the hand 106 are swingably or pivotably interconnected via joints J1 to J6. In the present embodiment, the multi-joint robot main body 100 is a six-axes multi-joint robot in which a degree of freedom is 6.

Figure 2:
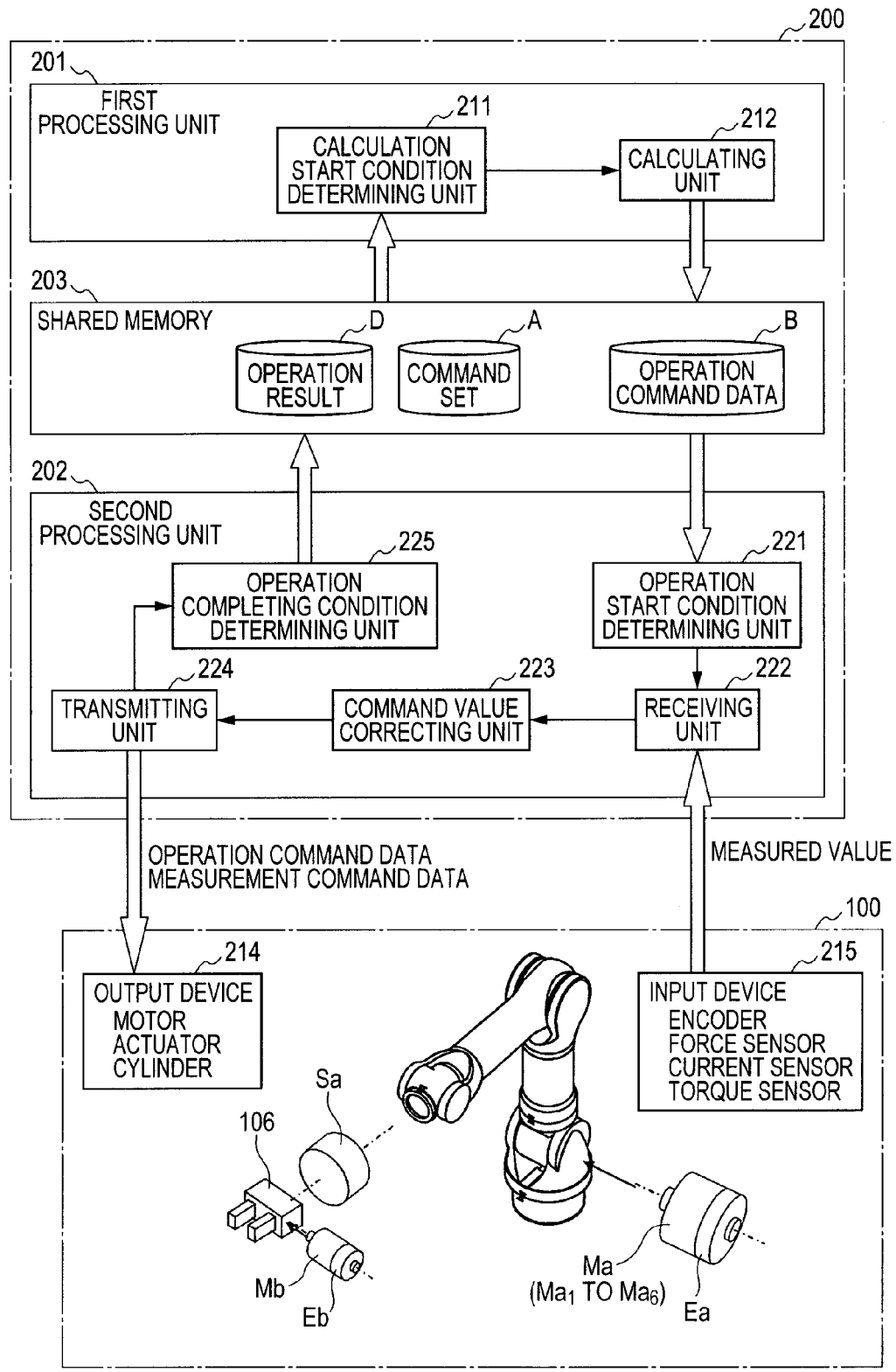
FIG. 2 is a block diagram illustrating the schematic constitution of the robot apparatus according to the first embodiment of the present invention.

FIG. 2 is a block diagram illustrating the schematic constitution of the robot apparatus 50. The joints J1 to J6 are provided with arm motors Ma ($Ma_1$ to $Ma_6$) as a plurality of driving units which drive the joints J1 to J6, and the hand 106 is provided with a motor Mb for the hand. Moreover, although not shown, the multi-joint robot main body 100 includes a direct acting actuator, a cylinder and the like. The arm motors Ma, the hand motor Mb, the direct acting actuator and the cylinder constitute an output device 214.

Moreover, the joints J1 to J6 are provided with arm encoders Ea which detect rotation angles of the arm motors Ma. Moreover, the hand 106 is provided with a hand encoder Eb which detects a rotation angle of the hand motor Mb. Between the hand 106 and the tip link 105, there is provided a force sensor Sa which detects a force and a torque acting on the hand 106. Moreover, although not shown, the multi-joint robot main body 100 is provided with a current sensor which detects a current supplied to each of the motors Ma and Mb, and a torque sensor which detects the torque of each of the joints J1 to J6. These encoders Ea and Eb, the force sensor Sa, the current sensor and the torque sensor constitute an input device 215 as a sensor which detects a state of the multi-joint robot main body 100. Hereinafter, the input device 215 and the output device 214 are generically referred to as devices 207.

The robot controlling device 200 roughly includes a first processing unit 201, a second processing unit 202, and a shared memory 203. The first processing unit 201 and the second processing unit 202 are accessibly connected to the shared memory 203. In the present embodiment, the robot controlling device 200 includes one dual core CPU, and cores in the dual core CPU perform functions of the first processing unit 201 and the second processing unit 202, respectively. It is to be noted that the robot controlling device 200 may include two single cores CPUs and the CPUs may perform the functions of the first processing unit 201 and the second processing unit 202, respectively.

In the first embodiment, the first processing unit 201 inputs a command to operate the multi-joint robot main body 100 to a desired position posture, and calculates, on the basis of this input command, operation command data (track data) where command values of joint angles to be output to the motors $Ma_1$ to $Ma_6$ are arranged in time series. Then, the operation command data as the calculation results is stored in the shared memory 203. In consequence, the first processing unit 201 performs track calculation processing in which times required for the calculations based on inverse kinematics are indefinite.

The second processing unit 202 performs synchronous processing which includes acquiring the operation command data stored in the shared memory 203, and synchronously outputting the command values to the motors $Ma_1$ to $Ma_6$ at predetermined time intervals. That is, the first embodiment allows the first processing unit 201 to perform the intricate track calculation processing in which the times required for the calculations are indefinite, and allows the second processing unit 202 to perform the synchronous processing of the motors $Ma_1$ to $Ma_6$.

Hereinafter, the processing units 201 and 202 and the shared memory 203 will be described in detail. The first processing unit 201 includes a calculation start condition determining unit 211 and a calculating unit 212. The second processing unit 202 includes an operation start condition determining unit 221, a receiving unit 222, a command value correcting unit 223, a transmitting unit 224 and an operation completing condition determining unit 225.

Figure 3:
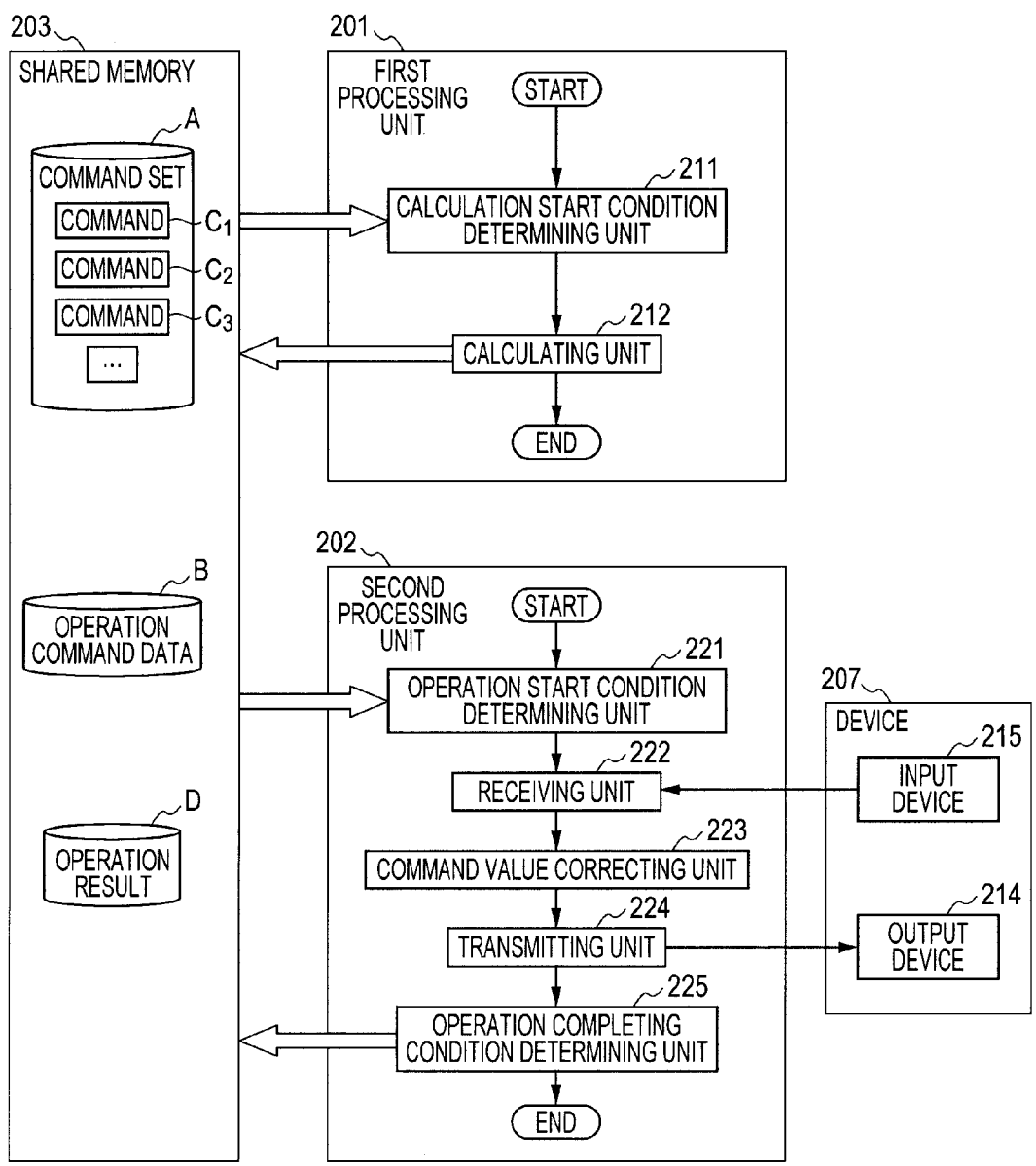
FIG. 3 is an explanatory chart illustrating a flow of an operation of each unit of a robot controlling device according to the first embodiment of the present invention.
Figure 4:
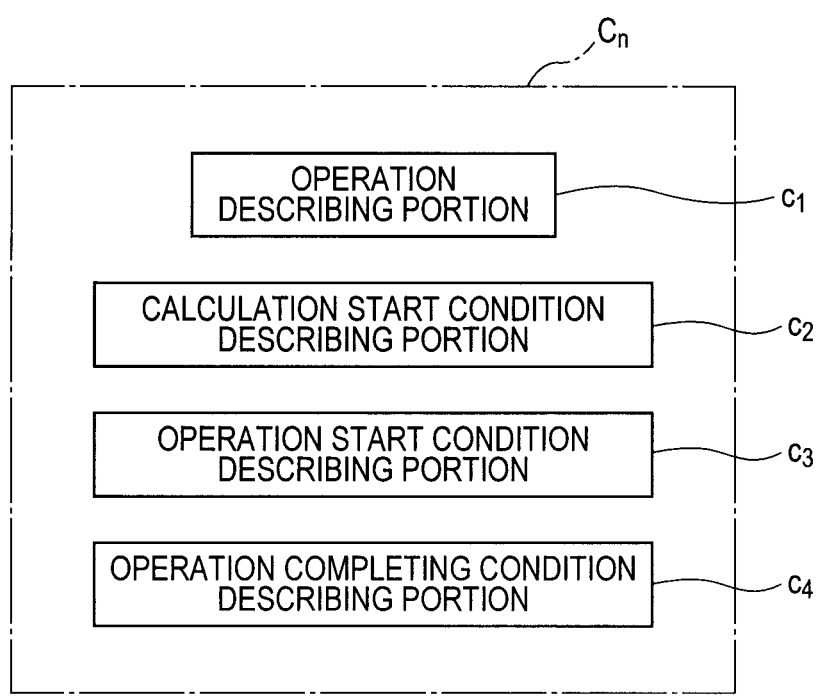
FIG. 4 is an explanatory diagram illustrating a constitution of each command stored in a shared memory according to the first embodiment of the present invention.

FIG. 3 is an explanatory chart illustrating a flow of an operation of each unit of the robot controlling device 200. First in the shared memory 203, a command set A including a plurality of commands $C_1$, $C_2$, $C_3$ and the like is beforehand stored as shown in FIG. 3. That is, in the shared memory 203, a plurality of commands for determining the joint angles of the multi-joint robot main body 100 are beforehand stored. The command set A is prepared in the form of, for example, a text type file for a purpose that a user describes an operation of a robot. A large number of commands are usually combined to realize the robot operation. As shown in FIG. 4, each of commands $C_n$ (n is a positive integer) includes an operation describing portion $c_1$, a calculation start condition describing portion $c_2$, an operation start condition describing portion $c_3$, and an operation completing condition describing portion $c_4$.

First, a command for allowing each of the motors $Ma_1$ to $Ma_6$ to perform a driving operation will be described among the commands stored in the shared memory 203. In the operation describing portion $c_1$, there is described a command to operate the multi-joint robot main body 100 (more specifically, the hand 106 of the multi-joint robot main body 100) to a desired position posture. Here, the command has the same meaning as "a job" or "an instruction". The command specifies the desired position posture of the hand 106 of the multi-joint robot main body 100 in an orthogonal coordinate system. That is, the desired position posture of the hand 106 is specified by (X, Y, Z, $\theta_X$, $\theta_Y$, $\theta_Z$) in the orthogonal coordinate system. Moreover, for example, a command to move the hand 106 to a coordinate position of X=100 mm and Y=200 mm is described in the operation describing portion $c_1$. Furthermore, for example, a command to specify a relative position posture of the hand 106 from the present position posture thereof is described in the operation describing portion $c_1$.

In the calculation start condition describing portion $c_2$, there are described conditions to start the track calculation by the calculating unit 212. For example, when another included command is executed, the command establishes a final desired position to be reached by the hand 106, and then the unit starts the calculation. Such conditions are described in the calculation start condition describing portion $c_2$. Moreover, for example, when the operation of the multi-joint robot main body 100 stops, the unit starts the calculation. When a value of the sensor is established, the unit starts the calculation. Such conditions are described in the calculation start condition describing portion $c_2$.

In the operation start condition describing portion $c_3$, there are described conditions to start the operation of each of the motors $Ma_1$ to $Ma_6$ for executing the command. For example, when two arms cooperatively operate, it is necessary to simultaneously start the operations. Therefore, for example, operation start conditions to wait for the calculation of two tracks are described in the operation start condition describing portion $c_3$.

In the operation completing condition describing portion $c_4$, there are described conditions to complete the operations of the motors $Ma_1$ to $Ma_6$. For example, in a case where tracks of the motors $Ma_1$ to $Ma_6$ reach terminal ends (in a case where the multi-joint robot main body 100 reaches the desired position posture), the operations of the motors $Ma_1$ to $Ma_6$ are completed. Such conditions are described in the operation completing condition describing portion $c_4$.

It is to be noted that commands for allowing the motor Mb, the direct acting actuator not shown, the cylinder not shown and the like to perform the driving operations have constitutions similar to those of the commands for the track calculation, and the commands are beforehand stored in the shared memory 203.

Moreover, in the shared memory 203, there is also stored a command for allowing the input device (the sensor) 215 to perform a measurement operation. Hereinafter, the command for allowing the input device 215 to perform the measurement operation will be described.

In the operation describing portion $c_1$, a measurement request for the input device 215 is described. In the calculation start condition describing portion $c_2$, there are described conditions to start measurement preparation required before the input device 215 performs the measurement. For example, when the input device 215 is the force sensor Sa or a visual sensor attached to the hand 106, there are described conditions that the device waits until the hand 106 reaches the desired position posture.

In the operation start condition describing portion $c_3$, conditions for allowing the input device 215 to start the measurement operation are described. In a case where the input device 215 is the visual sensor, there are described conditions on which the visual sensor can actually start the measurement. For example, there are described conditions that in a case where another robot apparatus grasps a measurement object, the device waits until the robot apparatus stops. In the operation completing condition describing portion $c_4$, conditions to complete the measurement operation by the input device 215 are described. For example, conditions to determine whether or not a measured value becomes stable are described.

Next, the first processing unit 201 will be described. The calculation start condition determining unit 211 successively refers to the calculation start condition describing portions $c_2$ of the plurality of commands $C_1$, $C_2$, $C_3$ and the like in the command set A stored in the shared memory 203. Then, the calculation start condition determining unit 211 acquires, from the shared memory 203, the command described in the operation describing portion $c_1$ of the command which satisfies the calculation start conditions.

The calculation start condition determining unit 211 waits until the conditions are satisfied, if there is not any command that satisfies the calculation start conditions. Therefore, first at the start, it is necessary for at least one of the plurality of commands $C_1$, $C_2$, $C_3$ and the like to satisfy the calculation start conditions. Moreover, although not shown, the device can be started by changing the calculation start conditions of the command from the outside.

On receiving the command acquired by the calculation start condition determining unit 211, the calculating unit 212 calculates, on the basis of the command, operation command data B where the command values of the joint angles to be output to the motors $Ma_1$ to $Ma_6$ are arranged in time series, based on an inverse kinematic model. Then, the calculating unit 212 stores the operation command data B as calculation results in the shared memory 203. Since pieces of operation command data B calculated by the calculating unit 212 are successively stored in the shared memory 203, the pieces of operation command data B are stored.

Figure 5A:
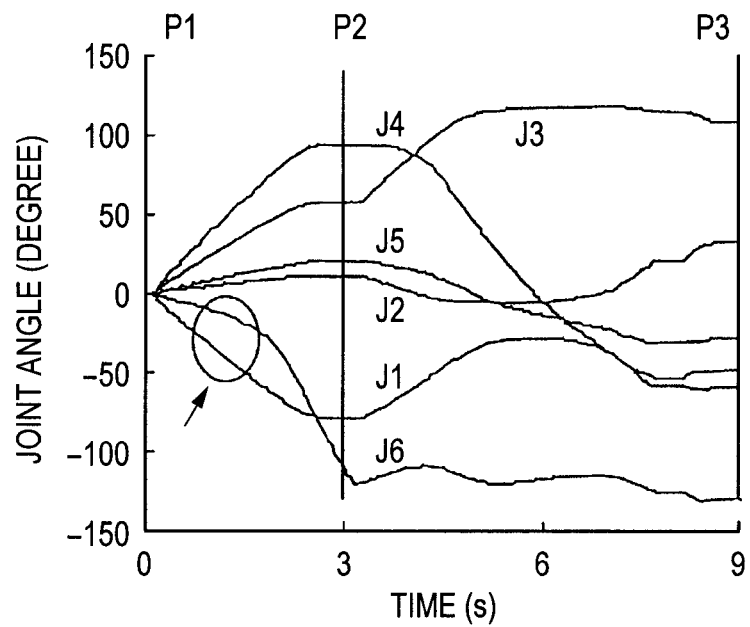
FIG. 5A is an explanatory diagram of operation command data to be output to joints of a multi-joint robot main body, and a time chart in a case where pieces of operation command data to be output to the respective joints are arranged in time series.

Hereinafter, the operation command data B will be described with reference to specific examples shown in FIGS. 5A and 5B. FIG. 5A is a time chart in a case where the pieces of operation command data B to be output to the respective joints are arranged in time series. In a case where the calculation start condition determining unit 211 acquires a command to move the multi-joint robot main body 100 from a position posture P1 to a position posture P3 via a position posture P2 shown in FIG. 5A, the calculating unit 212 calculates the operation command data B on the basis of the command. In the operation command data B, command values indicating the joint angles of the joints J1 to J6, to be output to the motors $Ma_1$ to $Ma_6$, are arranged in time series.

Figure 5B:
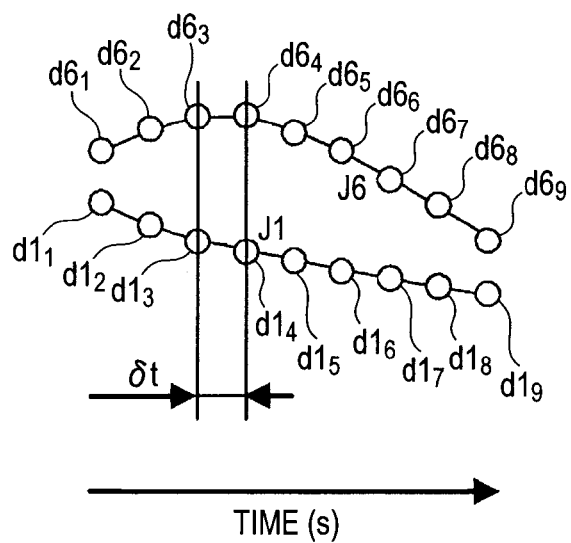
FIG. 5B is an explanatory diagram of the operation command data to be output to each of the joints of the multi-joint robot main body, and an enlarged diagram illustrating sequences of command values of a part surrounded with a circle of FIG. 5A.

FIG. 5B is an enlarged diagram illustrating sequences of command values of a part surrounded with a circle of FIG. 5A. As shown in FIG. 5B, command values $d1_1$ to $d1_9$ are calculated for the motor $Ma_1$ in the joint J1, and command values $d6_1$ to $d6_9$ are calculated for the motor $Ma_6$ in the joint J6. Then, the second processing unit 202 outputs the respective command values to the motors $Ma_1$ to $Ma_6$ at predetermined time intervals $\delta t$ (i.e. every synchronous time $\delta t$). As described above, the first processing unit 201 performs the track calculation processing in which the calculations are intricate and times required for the calculations are indefinite. When the above processing operation of the calculating unit 212 ends, the calculation start condition determining unit 211 performs the operation again.

It is to be noted that the calculating unit 212 does not perform the track calculation of the hand motor Mb, the direct acting actuator, the cylinder and the like, but calculates the operation command data thereof, including the command values, based on the input command. This also applies to the input device 215. The calculating unit does not calculate any track as in the motors $Ma_1$ to $Ma_6$, but performs the calculation before the measurement. For example, in the case of the force sensor Sa, the calculating unit calculates the value thereof, when the multi-joint robot main body 100 (the hand 106) comes to a predetermined position, whereby measurement command data as the calculation results is stored in the shared memory 203.

Next, the second processing unit 202 will be described. The operation start condition determining unit 221 refers to the operation start condition describing portions $c_3$ of the commands $C_1$, $C_2$, $C_3$ and the like stored in the shared memory 203. Then, the operation start condition determining unit 221 acquires, from the shared memory 203, the operation command data B corresponding to the command satisfying operation start conditions among the pieces of operation command data B and the like stored in the shared memory 203. At this time, in a case where a plurality of commands satisfy the operation start conditions, the operation start condition determining unit 221 acquires the pieces of operation command data from the shared memory 203. It is to be noted that also as to the measurement command data, when the command satisfies the operation start conditions, the operation start condition determining unit 221 acquires, from the shared memory 203, the measurement command data corresponding to the command.

The receiving unit 222 inputs signals as detection results from the input device 215 (the sensor). Then, in a case where the operation start condition determining unit 221 acquires the measurement command data, the detection results are corrected. For example, in the case of the force sensor Sa, a command value of the measurement command data is subtracted from the detection result every time the measurement is actually performed, whereby an influence of a gravity force is alleviated. For example, in the case of the visual sensor, a three-dimensional position to which the visual sensor is attached is calculated from the joint angles of the multi-joint robot main body 100, and used for the correction during the actual measurement.

The command value correcting unit 223 corrects the respective command values of the operation command data B acquired by the operation start condition determining unit 221, which are to be synchronously output to the motors $Ma_1$ to $Ma_6$, by use of the signal from the input device 215, whereby the unit outputs the command values to the transmitting unit 224. In consequence, when the input device 215 is, for example, the force sensor Sa, force feedback control can be executed. Moreover, when the input device 215 is the visual sensor, visual feedback control can be executed.

A method of calculating a correcting amount is already known. For example, impedance control or force control such as compliance control described in a document (Robot Engineering Handbook edited by the Robotics Society of Japan and published by Corona Publishing Co., Ltd. (Tokyo), 2005, 287 pages) can be utilized.

The transmitting unit 224 inputs the respective corrected command values acquired from the shared memory 203, and synchronously outputs the respective command values to the motors $Ma_1$ to $Ma_6$ at predetermined time intervals $\delta t$, i.e., every synchronous time $\delta t$. This synchronous time $\delta t$ is as short as milliseconds, for example, five milliseconds. The operation completing condition determining unit 225 determines whether or not the operation is completed, based on operation completing conditions in the processed command. Then, an operation result D is stored in the shared memory 203. The above-mentioned operations of the units 221 to 225 are repeatedly performed every synchronous time $\delta t$.

According to the above constitution, for example, the track calculation processing is performed in order of the commands $C_1$, $C_2$ and $C_3$, and the commands $C_1$ and $C_2$ are simultaneously executed. After the execution of the command $C_2$ ends, the command $C_3$ is executed. This case will be described. FIG. 6 illustrates a time chart of an operation example which uses three commands.

The calculating unit 212 of the first processing unit 201 calculates the operation command data corresponding to the command $C_1$ based on the command $C_1$ acquired from the shared memory 203, to store the data in the shared memory 203. Next, the calculating unit 212 calculates the operation command data corresponding to the command $C_2$ based on the command $C_2$ acquired from the shared memory 203, to store the data in the shared memory 203. Next, the calculating unit 212 calculates the operation command data corresponding to the command $C_3$ based on the command $C_3$ acquired from the shared memory 203, to store the data in the shared memory 203. In this manner, the calculating unit 212 of the first processing unit 201 successively calculates the respective commands one by one to store the calculation results in the shared memory 203.

At this time, the second processing unit 202 can operate independently of the calculating operation of the first processing unit 201, for example, even while the calculating unit 212 of the first processing unit 201 calculates the operation command data on the basis of the command $C_3$. Therefore, the operation start condition determining unit 221 of the second processing unit 202 accesses the shared memory 203 without waiting for the end of the calculation based on the command $C_3$ by the first processing unit 201, and acquires the operation command data of the commands $C_1$ and $C_2$. Then, the second processing unit executes the respective operations of the commands $C_1$ and $C_2$. Afterward, the second processing unit 202 executes the operation of the command $C_3$. Thus, in the first embodiment, the track calculation processing and synchronous processing can be performed in parallel, which shortens the operation time of the robot apparatus 50. In particular, the shortening of the operation time is very important in that product cost can be reduced, in a case where the robot apparatus 50 is incorporated in a production apparatus.

As described above, the first embodiment allows the first processing unit 201 to perform the track calculation processing, to store the operation command data B as the calculation results in the shared memory 203, so that the second processing unit 202 does not have to perform any intricate track calculation processing. Therefore, even when the first processing unit 201 takes long calculation time, the second processing unit 202 does not perform any track calculation processing based on the inverse kinematics. Therefore, immediately after the operation start conditions are satisfied, the respective motors $Ma_1$ to $Ma_6$ can be operated.

Then, the second processing unit 202 does not perform any intricate track calculation processing, but performs the synchronous processing which includes synchronously outputting, to the motors $Ma_1$ to $Ma_6$, the command values of the operation command data B already calculated by the first processing unit 201. Therefore, the processing can be realized without stopping the operation of the multi-joint robot main body 100, and the multi-joint robot main body 100 can smoothly be operated, which enables the multi-joint robot main body 100 to perform a humanly dextrous operation.

Further in the first embodiment, since the first processing unit 201 includes the calculation start condition determining unit 211, the calculating unit 212 can start the calculation at an appropriate timing. Moreover, since the second processing unit 202 includes the operation start condition determining unit 221, the operation can be started at the appropriate timing. That is, since the respective track calculation processing and synchronous processing can be performed at a satisfactory timing in accordance with the commands $C_1$, $C_2$, $C_3$ and the like, the robot apparatus can be synchronized with another operation apparatus (e.g. a movable table on which a grasping object is mounted).

In the above description, there has been described the case where the one robot controlling device 200 controls the one multi-joint robot main body 100. However, the same control operation is performed also in a case where the one robot controlling device 200 controls a plurality of multi-joint robot main bodies. That is, in the shared memory 203, commands for the respective multi-joint robot main bodies are beforehand stored, and the respective processing units 201 and 202 perform the track calculation processing and synchronous processing based on the commands, respectively. In particular, when the respective multi-joint robot main bodies are simultaneously operated, the commands $C_1$ and $C_2$ can simultaneously be output as shown in, for example, FIG. 6. Therefore, the plurality of multi-joint robot main bodies can synchronously be operated without being stopped. In consequence, the plurality of multi-joint robot main bodies can smoothly be operated, which enables the plurality of multi-joint robot main bodies to perform the humanly dextrous operation.

[Second Embodiment]

Figure 7:
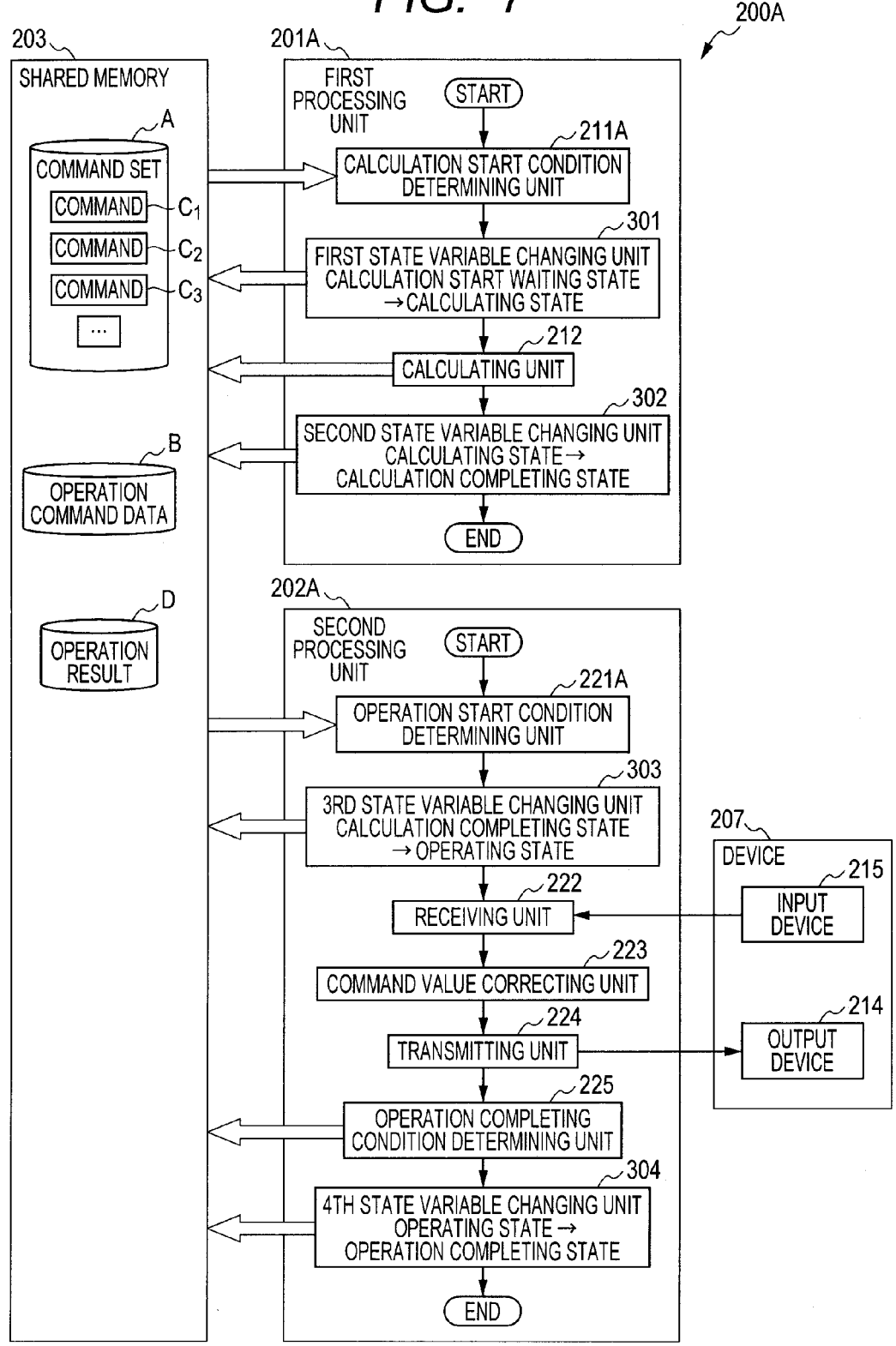
FIG. 7 is an explanatory chart illustrating a flow of an operation of a robot controlling device according to a second embodiment of the present invention.
Figure 8:
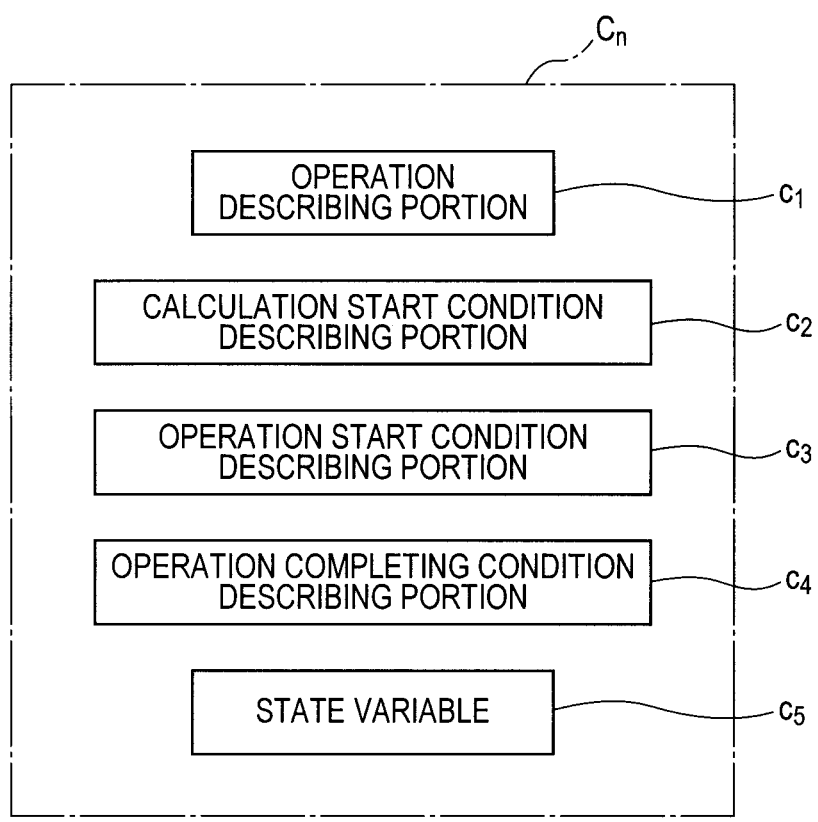
FIG. 8 is an explanatory diagram illustrating a constitution of each command stored in a shared memory of the robot controlling device according to the second embodiment of the present invention.

Next, a robot controlling device according to a second embodiment of the present invention will be described. FIG. 7 is an explanatory chart illustrating a flow of an operation of a robot controlling device 200A, and FIG. 8 is an explanatory diagram illustrating a constitution of each command stored in a shared memory. It is to be noted that in the second embodiment, constitutions similar to the above first embodiment are denoted with the same reference marks, and the descriptions thereof are omitted.

As shown in FIG. 8, each of commands $C_n$ beforehand stored in a shared memory 203 further includes a state variable $c_5$ in addition to an operation describing portion $C_1$, a calculation start condition describing portion $c_2$, an operation start condition describing portion $c_3$, and an operation completing condition describing portion $c_4$ described above in the first embodiment. In the second embodiment, the state variable $c_5$ is a value which means one of a calculation start waiting state, a calculating state, a calculation completing state, an operating state, and an operation completing state. First at the start, the state variable $c_5$ is set to the calculation start waiting state.

The calculation start waiting state is a state where the start of calculation of tracks is waited. The calculating state is a state where a calculating unit 212 shown in FIG. 7 starts the track calculation, and is calculating the tracks. The calculation completing state is a state where the calculation by the calculating unit 212 is completed, and operation command data B is stored in the shared memory 203. The operating state is a state where a second processing unit 202A starts an operation, and is operating, and the operation completing state is a state where the second processing unit 202A completes the operation.

Moreover, a first processing unit 201A shown in FIG. 7 includes a first state variable changing unit 301 and a second state variable changing unit 302 in addition to a calculation start condition determining unit 211A and the calculating unit 212. The calculation start condition determining unit 211A refers to a calculation start condition describing portion $c_2$ of each of commands $C_1$, $C_2$, $C_3$ and the like stored in the shared memory 203. Then, the calculation start condition determining unit 211A extracts a command which satisfies calculation start conditions and in which a state variable $c_5$ has a calculation start waiting state. Then, the calculation start condition determining unit 211A acquires, from the shared memory 203, one command described in an operation describing portion $c_1$ included in the command.

Here, if any corresponding command is not present, the calculation start condition determining unit 211A waits until the calculation conditions are satisfied. Therefore, first at the start, at least one command has to satisfy the calculation start conditions. Moreover, even when all the commands do not satisfy the calculation start conditions, it is easy to change the calculation start conditions and start from an external program not shown. For example, the state variable may be changed to the start waiting state.

Next, the first state variable changing unit 301 changes, from the calculation start waiting state to the calculating state, the state variable $c_5$ of the command acquired from the commands $C_1$, $C_2$, $C_3$ and the like stored in the shared memory 203 by the calculation start condition determining unit 211A. Then, the calculating unit 212 calculates the operation command data B on the basis of the command acquired by the calculation start condition determining unit 211A, and stores the operation command data B in the shared memory 203.

That is, the calculation start condition determining unit 211A does not acquire any command from the commands in which the state variables $c_5$ have states other than the calculation start waiting state, which can avoid redundant calculation.

The second state variable changing unit 302 changes the state variable $c_5$ of the command corresponding to the operation command data completed to be calculated by the calculating unit 212 among the commands $C_1$, $C_2$, $C_3$ and the like stored in the shared memory 203, in a case where the calculating unit 212 completes the calculation. Specifically, the unit changes the state variable $c_5$ from the calculating state to the calculation completing state. When the above changing operation by the second state variable changing unit 302 ends, the operation by the calculation start condition determining unit 211A is performed again.

Next, the second processing unit 202A will be described. The second processing unit 202A includes a third state variable changing unit 303 and a fourth state variable changing unit 304 in addition to an operation start condition determining unit 221A, a receiving unit 222, a command value correcting unit 223, a transmitting unit 224 and an operation completing condition determining unit 225.

The operation start condition determining unit 221A refers to an operation start condition describing portion $c_3$ of each of the commands $C_1$, $C_2$, $C_3$ and the like stored in the shared memory 203. Then, the operation start condition determining unit 221A acquires, from the shared memory 203, the operation command data B corresponding to a command which satisfies operation start conditions and in which the state variable $c_5$ has a calculation completing state among pieces of operation command data B and the like stored in the shared memory 203. At this time, when a plurality of commands satisfy the operation start conditions and have the calculation completing state, the operation start condition determining unit 221A acquires all the pieces of operation command data B satisfying the conditions from the shared memory 203.

The third state variable changing unit 303 changes, from the calculation completing state to the operating state, the state variable $c_5$ of the command corresponding to the operation command data B acquired from the commands stored in the shared memory 203 by the operation start condition determining unit 221A. In consequence, the redundant execution of the operating command can be avoided, and control becomes stable.

The receiving unit 222 inputs a signal as a detection result from an input device 215 (a sensor). Then, the detection result is corrected in a case where the operation start condition determining unit 221A acquires measurement command data. For example, in the case of a force sensor Sa, a command value of the measurement command data is subtracted from the detection result every time the measurement is actually performed, whereby an influence of a gravity force is alleviated. Moreover, for example, in the case of a visual sensor, a three-dimensional position to which the visual sensor is attached is calculated from joint angles of a multi-joint robot main body 100, and used for the correction during the actual measurement.

The command value correcting unit 223 corrects the respective command values of the operation command data B acquired by the operation start condition determining unit 221A, which are to be synchronously output to the motors $Ma_1$ to $Ma_6$, by use of the signal from the input device 215, whereby the unit outputs the command values to the transmitting unit 224. In consequence, when the input device 215 is, for example, the force sensor Sa, force feedback control can be executed. Moreover, when the input device 215 is the visual sensor, visual feedback control can be executed.

The transmitting unit 224 inputs the respective corrected command values acquired from the shared memory 203, and synchronously outputs the respective command values to the motors $Ma_1$ to $Ma_6$ at predetermined time intervals δt, i.e., every synchronous time δt. This synchronous time δt is as short as milliseconds, for example, five milliseconds. The operation completing condition determining unit 225 determines whether or not the operation is completed, based on operation completing conditions in the processed command. Then, an operation result D is stored in the shared memory 203.

The fourth state variable changing unit 304 changes, from the operating state to the operation completing state, the state variable $c_5$ of the command corresponding to the operation command data B when the operation is completed, among the commands stored in the shared memory 203. The above-mentioned operations of the respective units 221A to 304 are repeatedly performed every synchronous time δt. It is to be noted that the units similarly operate, also in a case where the command stored in the shared memory 203 is a command for the input device 215.

As described above, the second embodiment allows the first processing unit 201A to perform the track calculation processing, to store the operation command data B as the calculation results in the shared memory 203, and hence the second processing unit 202A does not have to perform any intricate track calculation processing. Therefore, even if the first processing unit 201A takes long calculation time, the second processing unit 202A does not perform any track calculation processing based on inverse kinematics. Therefore, immediately after the operation start conditions are satisfied, the motors $Ma_1$ to $Ma_6$ can be operated.

Then, the second processing unit 202A does not perform any intricate track calculation processing, but performs synchronous processing which includes synchronously outputting, to the motors $Ma_1$ to $Ma_6$, the command values of the operation command data B already calculated by the first processing unit 201A. Therefore, the processing can be realized without stopping the operation of the multi-joint robot main body 100, and the multi-joint robot main body 100 can smoothly be operated, which enables the multi-joint robot main body 100 to perform a humanly dextrous operation.

Further in the second embodiment, since the first processing unit 201A includes the calculation start condition determining unit 211A, the calculating unit 212 can start the calculation at an appropriate timing. Moreover, since the second processing unit 202A includes the operation start condition determining unit 221A, it is possible to start the operation at the appropriate timing. That is, since the respective track calculation processing and synchronous processing can be performed at a satisfactory timing in accordance with the commands $C_1$, $C_2$, $C_3$ and the like, a robot apparatus can be synchronized with another operation apparatus (e.g. a movable table on which a grasping object is mounted).

Further in the second embodiment, the commands $C_1$, $C_2$, $C_3$ and the like include the state variables $c_5$. Therefore, when the state variables $c_5$ are monitored, control operations by the first processing unit 201A and the second processing unit 202A becomes stable.

In the above description, there has been described the case where the one robot controlling device 200A controls the one multi-joint robot main body 100. However, the same control operation is performed in a case where the one robot controlling device 200A controls a plurality of multi-joint robot main bodies. That is, in the shared memory 203, commands for the respective multi-joint robot main bodies are beforehand stored, and the processing units 201A and 202A perform the track calculation processing and synchronous processing based on the commands, respectively. In particular, when the respective multi-joint robot main bodies are simultaneously operated, the commands $C_1$ and $C_2$ can simultaneously be output as shown in, for example, FIG. 6. Therefore, the plurality of multi-joint robot main bodies can synchronously be operated without being stopped. In consequence, the plurality of multi-joint robot main bodies can smoothly be operated, which enables the plurality of multi-joint robot main bodies to perform the humanly dextrous operation.

[Third Embodiment]

Figure 9:
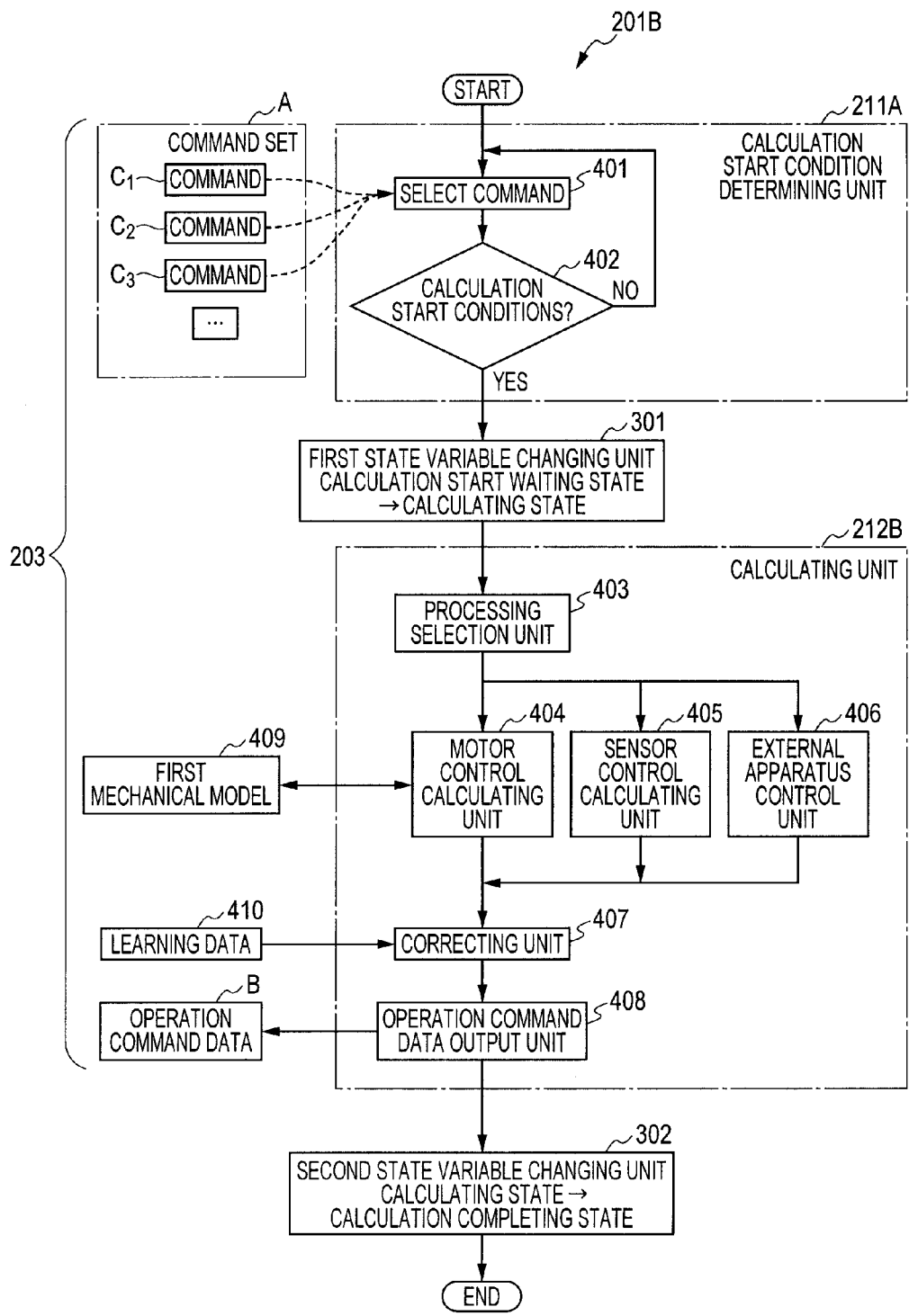
FIG. 9 is an explanatory chart illustrating a flow of an operation of a first processing unit of a robot controlling device according to a third embodiment of the present invention.
Figure 10:
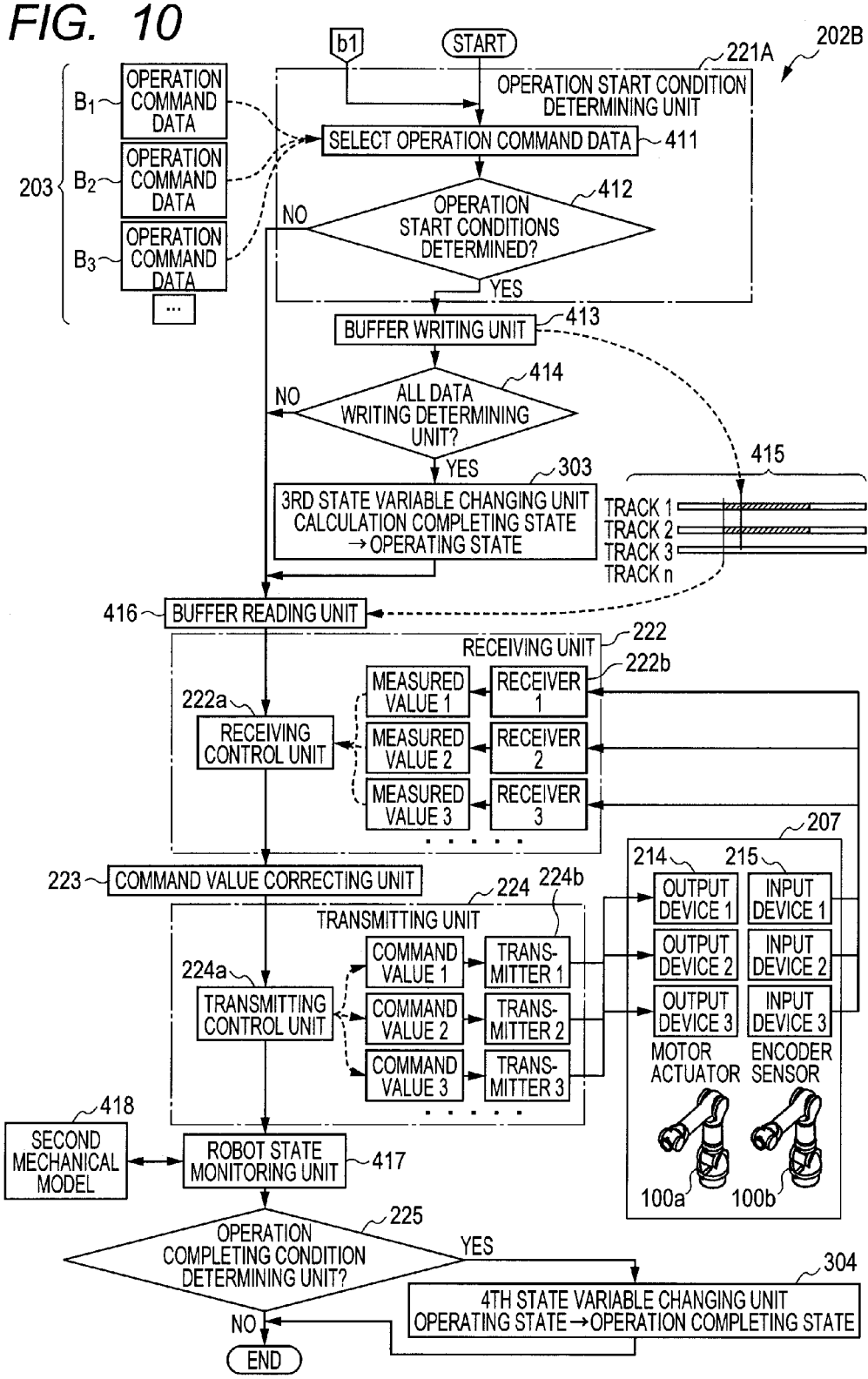
FIG. 10 is an explanatory chart illustrating a flow of an operation of a second processing unit of the robot controlling device according to the third embodiment of the present invention.

Next, a robot controlling device according to a third embodiment of the present invention will be described. FIG. 9 is an explanatory chart illustrating a flow of an operation of each unit in a first processing unit of the robot controlling device. FIG. 10 is an explanatory chart illustrating a flow of an operation of each unit in a second processing unit of the robot controlling device. It is to be noted that constitutions similar to the above first and second embodiments are denoted with the same reference marks, and the descriptions thereof are omitted. Here, in the above first and second embodiments, there has been described a case where one multi-joint robot main body 100 is provided, but the same control operation is performed in a case where two or more bodies are provided. In the third embodiment, two multi-joint robot main bodies 100a and 100b are objects, but the control operation does not change, when one multi-joint robot main body is provided and when three or more bodies are provided.

In the third embodiment, the robot controlling device includes a first processing unit 201B shown in FIG. 9 and a second processing unit 202B shown in FIG. 10. First, the first processing unit 201B will be described. A calculation start condition determining unit 211A refers to a calculation start condition describing portion $c_2$ of each of commands $C_1$, $C_2$, $C_3$ and the like in a command set A stored in a shared memory 203, and selects a command which satisfies calculation start conditions (401). At this time, the calculation start condition determining unit 211A searches for the command on conditions that a state variable $c_5$ is a calculation start waiting state (402). If the corresponding command is not present, the unit again refers to the calculation start condition describing portion $c_2$ of each of the commands $C_1$, $C_2$, $C_3$ and the like in the command set A stored in the shared memory 203, and selects the command which satisfies the calculation start conditions.

After the calculation start condition determining unit 211A acquires one command, a first state variable changing unit 301 changes the state variable $c_5$ from the calculation start waiting state to a calculating state.

A calculating unit 212B calculates operation command data B based on the command acquired by the calculation start condition determining unit 211A. The calculating unit 212B includes a processing selection unit 403, a motor control calculating unit 404, a sensor control calculating unit 405, an external apparatus control unit 406, a correcting unit 407, and an operation command data output unit 408.

The processing selection unit 403 interprets contents of the command. The motor control calculating unit 404 calculates tracks of joints of the multi-joint robot main bodies 100a and 100b with respect to arm motors $Ma_1$ to $Ma_6$. After the tracks are determined, the unit calculates a speed of each joint advancing along the track so that during accelerating and decelerating, a maximum acceleration, a maximum speed and a maximum motor torque are not exceeded. Various calculation methods have been suggested. For example, the following document discusses the method of calculating the tracks. J. E. Bobrow, S. Dubowsky, J. S. Gibson: Time-Optimal Control of Robotic Manipulators Along Specified Paths, the International Journal of Robotics Research, Vol. 4, No. 3 (1985), p. 3-17.

Such calculation of the tracks requires a first mechanical model 409 which is the model of inverse kinematics. Here, the first mechanical model 409 is a simulator of the multi-joint robot main bodies 100a and 100b, and includes an inverse calculating unit. By use of the mechanical model 409, the motor control calculating unit 404 calculates the torque and acceleration applied to the respective joints when the multi-joint robot main bodies 100a and 100b are operated, to perform the track calculation, thereby calculating the operation command data B.

The sensor control calculating unit 405 calculates measurement command data to output the data to an input device (a sensor) 215.

The external apparatus control unit 406 copes with commands of external apparatuses other than the motors of the multi-joint robot main bodies 100a and 100b, for example, tables controlled by the motors and air cylinders. The unit outputs the operation command data to devices, respectively.

Next, the correcting unit 407 corrects the calculated operation command data B. In general, a multi-joint robot has a positioning accuracy which is lower than a position reproducibility. For example, if a hand of a six-axes multi-joint robot main body is linearly moved, the hand undulates owing to a length between the joints and a joint attaching error. A movement error due to such causes is reproduced. Therefore, when the hand moves next time, improvement based on the result of the previous movement can be expected. Therefore, the third embodiment adds learning data 410 beforehand stored in the shared memory 203. A method of obtaining the learning data 410 can be performed by a known technology.

As discussed in, for example, a document (Robot Engineering Handbook edited by the Robotics Society of Japan and published by Corona Publishing Co., Ltd. (Tokyo), 2005, 320-th page), the next operation command is corrected based on a difference between an once moved track and a desired track. In consequence, the track can be brought close to the desired track.

Next, the operation command data output unit 408 outputs, to the shared memory 203, the corrected operation command data B calculated by using the first mechanical model 409. The operation command data B is stored in a memory area which is separate from a memory area where the command set A is stored. The operation command data B is generated every time the command is processed. Therefore, pieces of the operation command data B are stored in the shared memory 203.

When the above-mentioned operation is completed, the first processing unit 201B restarts the processing of another command in the calculation start condition determining unit 211A.

Next, a second processing unit 202B will be described. The second processing unit 202B includes an operation start condition determining unit 221A, a receiving unit 222, a command value correcting unit 223, a transmitting unit 224, an operation completing condition determining unit 225, a third state variable changing unit 303 and a fourth state variable changing unit 304 in the same manner as in the above second embodiment. Furthermore, the second processing unit 202B includes a buffer writing unit 413, an all data writing determining unit 414, a buffer unit 415, a buffer reading unit 416 and a robot state monitoring unit 417.

The operation start condition determining unit 221A refers to an operation start condition describing portion $c_3$ of each of the commands $C_1$, $C_2$, $C_3$ and the like corresponding to the respective pieces of operation command data in pieces of operation command data $B_1$, $B_2$, $B_3$ and the like, and selects all the pieces of operation command data that satisfy operation start conditions (411). At this time, the operation start condition determining unit 221A searches for the data on conditions that the state variable $c_5$ is a calculation completing state (412). In consequence, the operation start condition determining unit 221A acquires all the pieces of operation command data that satisfy the operation start conditions.

In a case where there is not any piece of data that satisfies the operation start conditions, the flow advances to the buffer reading unit 416. In a case where there is one piece of data that satisfies the operation start conditions, the buffer writing unit 413 writes the data in the buffer unit 415.

The buffer unit 415 is called a ring buffer, and includes tracks corresponding to devices 207, respectively. That is, the buffer unit 415 includes (six) tracks corresponding to the arm motors $Ma_1$ to $Ma_6$, respectively, and additionally includes tracks corresponding to the other devices, respectively. The buffer unit 415 holds a writing position and a reading position.

The buffer unit 415 is a matrix-like memory area, and the number of rows (the tracks) corresponds to the number of all the devices 207, and is called a track width. For example, when 30 motors and sensors are provided in all, the buffer unit has a track width of 30 rows. A column direction indicates time, and one column indicates one zone of synchronous time $\delta t$. For example, when the synchronous time interval $\delta t$ is 1 ms and 40 seconds are accumulated, the number of the columns is 40,000. The buffer writing unit 413 uses the writing position of the buffer unit 415 as a reference, to continuously write the command values of the operation command data acquired by the operation start condition determining unit 221A in the track corresponding to each of the devices 207 in order of time series.

Moreover, the buffer reading unit 416 reads the command values to be output at the same time from the respective tracks of the buffer unit 415. The unit is characterized by reading the command values of the operation command data for all the devices 207 at the same time. Moreover, after the reading, the next reading column is shifted as much as one column. If the unit reaches the last column, the unit returns to the first column. That is, the buffer unit 415 has a ribbon-like ring shape with the track width. Moreover, the buffer unit 415 first resets the whole unit to a state of "no operation command".

In FIG. 10, the buffer writing unit 413 writes the operation command data acquired by the operation start condition determining unit 221A from the writing position of the buffer unit 415 into the corresponding track. When the writing processing of the command values for one column ends, the writing position is advanced as much as the written pieces of data. When the writing position reaches the terminal end of the buffer unit 415, the position is returned to the top of the buffer unit 415. Moreover, in a case where the writing processing of all the command values of the operation command data does not end within predetermined time (the synchronous time δt), the remaining command values are written in the buffer unit 415 at the next turn. The writing position advances as much as the written data pieces (the command values), and hence continuity is not lost.

When the writing processing by the buffer writing unit 413 is completed, the all data writing determining unit 414 determines whether or not all the writing of the operation command data is completed. If the processing is not completed, the processing advances to processing of the buffer reading unit 416. Here, in the case where the processing is not completed, only part of the command values is written as described above, and the command values are left in the operation command data. When the writing processing is completed, the third state variable changing unit 303 changes the state variable $c_5$ from the calculation completing state to an operating state.

The buffer reading unit 416 reads the operation command data from the reading position of the buffer unit 415. By the reading from the buffer unit 415, the data (the command values) for all the devices 207 can simultaneously be acquired. After reading the data, the buffer reading unit 416 performs the following two operations. In the first operation, the data at the reading position is cleared, and the state is returned to the original state without any operation command. In the second operation, the reading position is updated to the next position. At this time, in a case where the reading position reaches the terminal end of the buffer unit 415, the position is returned to the top of the buffer unit 415. Therefore, when the buffer writing unit 413 does not write any operation command, the state without any operation command is read.

In this manner, the operation command data B stored in the shared memory 203 is once stored in the buffer unit 415, which can noticeably decrease the number of times to access the shared memory 203. This eventually decreases the number of access colliding times when both the first processing unit 201B and the second processing unit 202B simultaneously access the shared memory 203, whereby an operation speed increases.

The receiving unit 222 inputs a measured value from the input device 215 (the sensor). In a case where the input device is, for example, an encoder, the receiving unit receives a rotation angle position of a motor. Specifically, each of receivers 222b inputs a signal from each of the input devices 215, and outputs each measured value to a receiving control unit 222a. The receiving control unit 222a corrects each measured value, and outputs the value to the command value correcting unit 223.

The command value correcting unit 223 corrects the operation command data B based on the input measured value. In a case where the input device 215 is a force sensor, force feedback control can be executed, and in a case where the input device 215 is a visual sensor, visual feedback control can be executed.

The transmitting unit 224 transmits the command values of the operation command data B to the devices 207. In a case where the device 207 is the motor, the transmitting unit transmits the command value indicating a motor joint angle, and in a case where the device 207 is the sensor, the unit transmits the command value indicating a signal input command. Specifically, a transmitting control unit 224a outputs each command value at predetermined time, and each of transmitters 224b outputs the value to each output device 214. The respective output devices 214 operate based on the input command values.

The robot state monitoring unit 417 monitors postures of the multi-joint robot main bodies 100a and 100b, and calculates position postures of the multi-joint robot main bodies 100a and 100b (the hands) by use of a second mechanical model 418 which is a forward kinematic model. For example, the calculation results of the hand position posture are used for determination in a case where the hand entering a preset movement prohibition region is stopped.

Here, the first processing unit 201B calculates command values indicating joint angles of the multi-joint robot main bodies 100a and 100b from the position postures of the hands of the multi-joint robot main bodies 100a and 100b, by use of the first mechanical model 409.

On the other hand, the second processing unit 202B uses the second mechanical model 418 which is separate from the first mechanical model 409, when monitoring the states of the multi-joint robot main bodies 100a and 100b. That is, the robot state monitoring unit 417 executes forward calculation by use of the second mechanical model 418 to calculate the positions of the hands of the multi-joint robot main bodies 100a and 100b from the joint angles of the multi-joint robot main bodies 100a and 100b. Then, the robot state monitoring unit 417 stores the calculation results in a memory area which is separate from the memory areas of the command set A and operation command data B in the shared memory 203.

Therefore, since the first processing unit 201B and the second processing unit 202B are provided with two respective independent mechanical models 409 and 418, the units do not interfere with each other. That is, the second processing unit 202B updates the contents of the memory which holds the position postures of the multi-joint robot main bodies 100a and 100b (the hands). However, the data is stored in the memory area which is separate from the memory areas of the command set A and operation command data B, and hence the units do not influence each other.

Next, the operation completing condition determining unit 225 determines whether or not the operation is completed, based on operation completing conditions in the processed command. In a method of determining the completion of the operation, it is determined that the operation is completed, for example, when all the command values of the operation command data are read from the buffer unit 415 and transmitted to the device 207. Alternatively, when the positions of the hands of the multi-joint robot main bodies 100a and 100b enter a preset movement completion region, it is determined that the operation is completed. In the case of the completion of the operation, the fourth state variable changing unit 304 changes the state variable $c_5$ from the operating state to an operation completing state. The above processing of the second processing unit 202B is repeatedly performed every predetermined synchronous time δt.

Therefore, in the same manner as in the above first and second embodiments, the third embodiment allows the first processing unit 201B to perform the track calculation processing, to store the operation command data B as the calculation results in the shared memory 203, and hence the second processing unit 202B does not have to perform any intricate track calculation processing. In consequence, it is possible to realize the synchronous processing which includes synchronously outputting the command values of the operation command data B already calculated by the first processing unit 201B to the motors $Ma_1$ to $Ma_6$, without stopping the operations of the multi-joint robot main bodies 100a and 100b. This enables the multi-joint robot main bodies 100a and 100b to perform a humanly dextrous operation.

[Fourth Embodiment]

Figure 11:
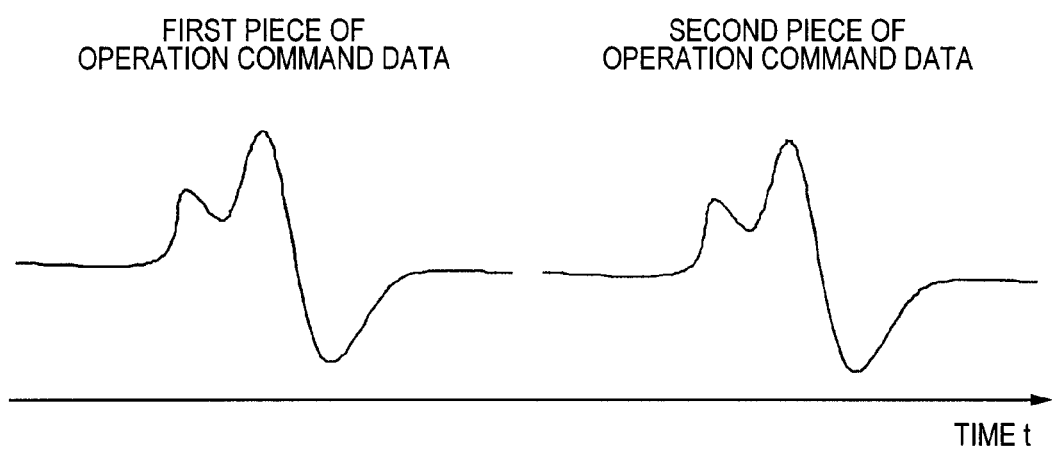
FIG. 11 is a diagram illustrating an example of operation command data generated by a robot controlling device according to a fourth embodiment of the present invention.

Next, a robot controlling device according to a fourth embodiment of the present invention will be described. It is to be noted that constitutions of the robot controlling device are similar to the above first to third embodiments. FIG. 11 is a diagram illustrating an example of operation command data generated by the robot controlling device. It is to be noted that a multi-joint robot main body is multi-axial, and hence a plurality of command value sequences are output to the motors of joints, but only one command value sequence is illustrated for description. When the multi-joint robot main body repeats the same operation, a first piece of operation command data is the same as a second piece of operation command data, and hence the calculation of the second and subsequent pieces of operation command data can be omitted.

Therefore, in the fourth embodiment, a calculating unit 212 (212B) determines whether or not the operation command data calculated on the basis of a command acquired by a calculation start condition determining unit 211 (211A) matches operation command data B stored in a shared memory 203. Then, in a case where the calculating unit 212 (212B) determines that these pieces of data match each other, the calculation of the operation command data is omitted.

Here, the operation command data stored in the shared memory 203 is not deleted but is left, even if the data is once read by an operation start condition determining unit 221 (221A). In consequence, even when the calculation is omitted by the calculating unit 212 (212B), the operation start condition determining unit 221 (221A) can acquire the operation command data again, because the operation command data is not deleted but is left in the shared memory 203.

Here, commands $C_1$, $C_2$, $C_3$ and the like have flags each indicating whether or not the operation command data has been calculated, and the calculating unit 212 (212B) can determine whether or not the data has been calculated, with reference to the flag. This flag is changed by the calculating unit 212 (212B), after the calculation by the calculating unit 212 (212B) ends.

As described above, in the fourth embodiment, the operation command data calculated by a first operation is reused in second and subsequent operations. In this way, the intricate track calculations are omitted. Therefore, a multi-joint robot main body 100 can be operated at a higher speed, and a calculation ability of a first processing unit 201 (201A and 201B) can be set apart for later use.

[Fifth Embodiment]

Figure 12:
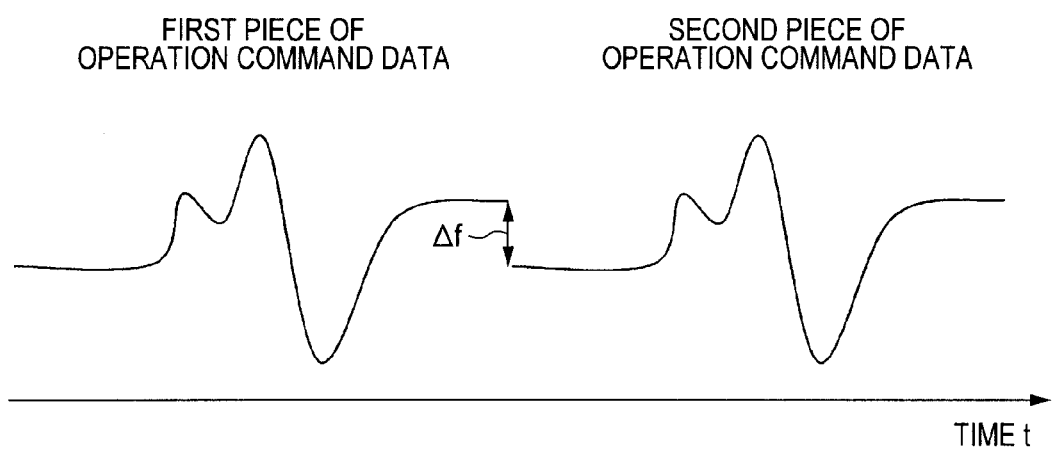
FIG. 12 is a diagram illustrating an example of operation command data generated by a robot controlling device according to a comparative example.

Next, a robot controlling device according to a fifth embodiment of the present invention will be described. In the above fourth embodiment, there has been described a case where a terminal end value of one of two continuous pieces of operation command data matches a start end value of the other piece of operation command data as shown in FIG. 11. However, as shown in FIG. 12, a terminal end value of one of two continuous pieces of operation command data does not match a start end value of the other piece of operation command data, and the values shift from each other as much as a difference Δf sometimes. When these values do not match each other, an operation of a multi-joint robot main body based on the second piece of operation command data is not smoothly operated. Therefore, the fifth embodiment performs processing which includes adding an offset value.

Figure 13:
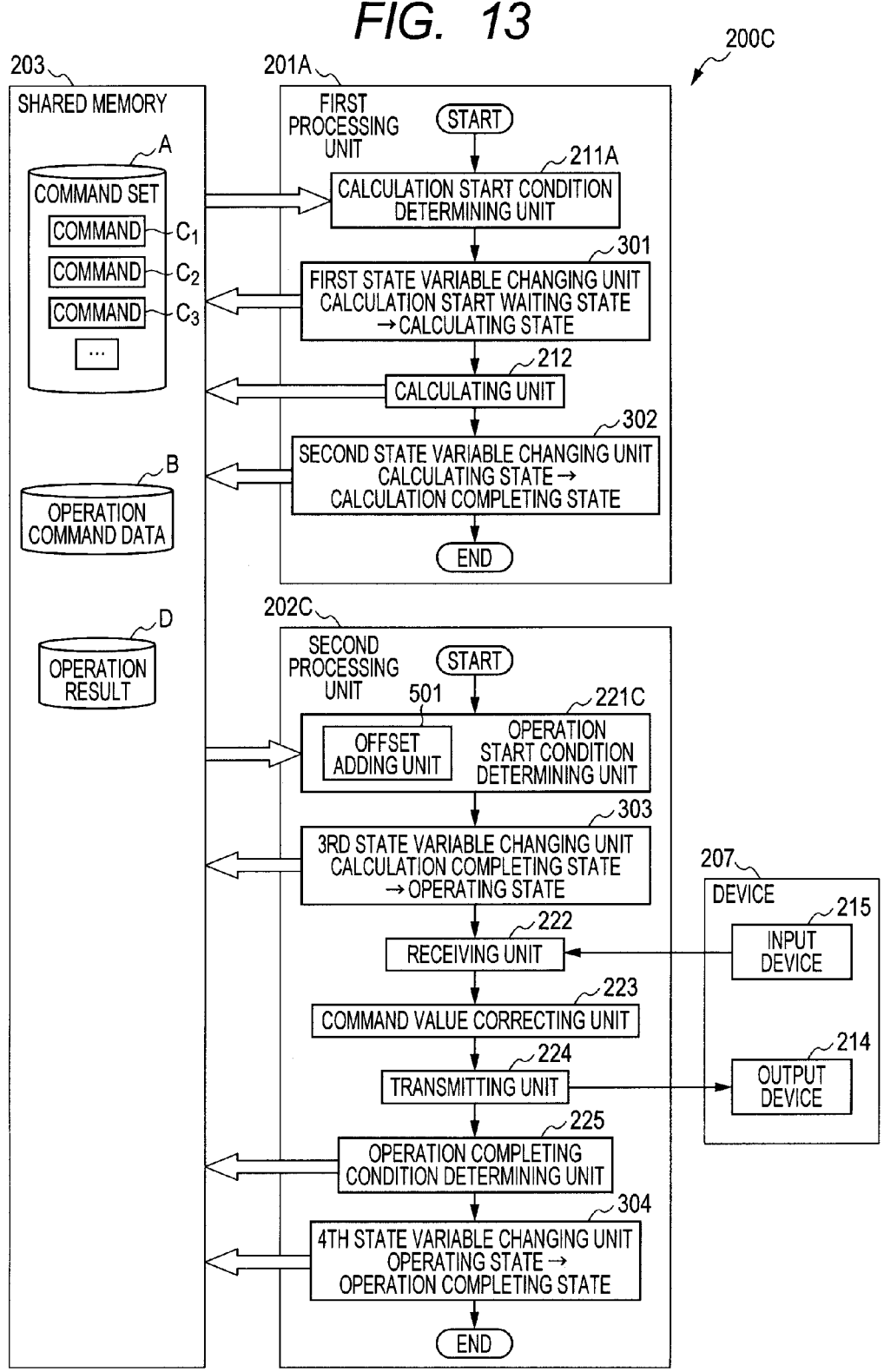
FIG. 13 is an explanatory chart illustrating a flow of an operation of a robot controlling device according to a fifth embodiment of the present invention.

FIG. 13 is a chart illustrating a flow of an operation of each unit of a robot controlling device 200C according to the fifth embodiment. It is to be noted that the device of FIG. 13 is different from the robot controlling device 200A of the above second embodiment in an operation of an operation start condition determining unit. The other constitutions are the same, and are, accordingly, denoted with the same reference numerals, and the descriptions thereof are omitted.

A second processing unit 202C of the robot controlling device 200C includes an operation start condition determining unit 221C which is different from the above second embodiment. Specifically, the operation start condition determining unit 221C has a function of operating in the same manner as in the operation start condition determining unit 221A of the second embodiment, and additionally includes an offset adding unit 501.

That is, the offset adding unit 501 of the operation start condition determining unit 221C calculates the difference Δf between a last command value (a terminal end value) of operation command data previously acquired from a shared memory 203 and a first command value (a start end value) of operation command data presently acquired from the shared memory 203. Then, the offset adding unit 501 of the operation start condition determining unit 221C adds an offset value which gradually decreases from the difference Δf as an initial value to zero, to the command value in order of time series from the first command value of the operation command data presently acquired from the shared memory 203.

That is, when the operation command data is reused, the offset adding unit 501 calculates a difference between top data of the operation command data and the present position, and adds, to the operation command data, the offset value which gradually decreases from the difference as the initial value to zero.

Figure 14:
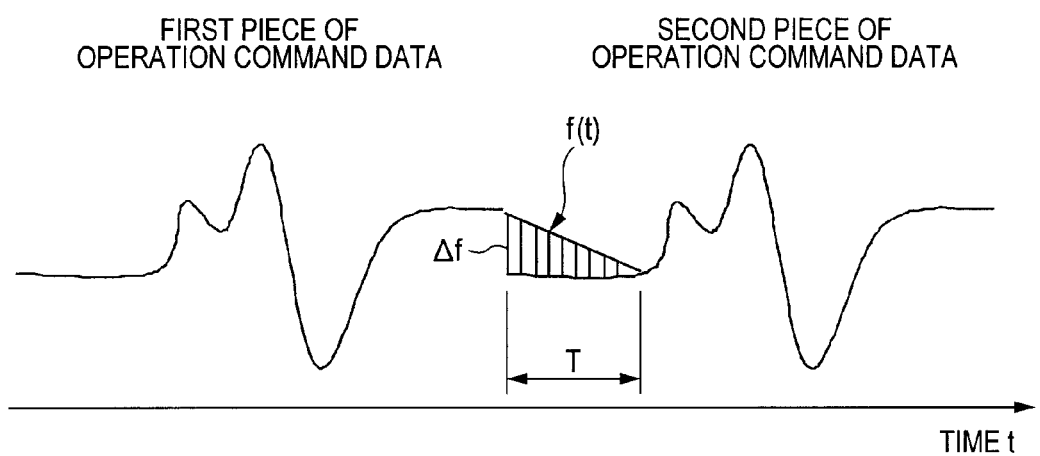
FIG. 14 is a diagram illustrating an example of operation command data having an offset value added thereto and generated by the robot controlling device according to the fourth embodiment of the present invention.

FIG. 14 illustrates an example of the operation command data to which the offset value has been added. When an offset value f(t) which gradually decreases from the difference Δf as the initial value to zero is added to the operation command data, a smooth operation can be performed.

The offset function f(t) has two necessary requirements as follows. The requirements are that the initial value is equal to the difference Δf, and the value decreases to zero with an elapse of time. For example, when the difference is Δf, time required until the offset value becomes zero is T and time elapsed from when the first command value of the operation command data to be reused is output is t, the following offset function f(t) is effective.

$$f(t) = \Delta f \frac{T-t}{T} \quad 0 \le t \le T \qquad \text{[Equation 1]}$$
$$f(t) = 0 \qquad T < t$$

A calculation amount of this linear function is small, and hence a burden on a computer is light.

However, the next function is smoother.

$$f(t) = \Delta f \frac{\left[\cos\left[\frac{\pi t}{T}\right] + 1\right]}{2} \quad 0 \le t \le T \qquad \text{[Equation 2]}$$
$$f(t) = 0 \qquad T < t$$

Both ends of this cosine function are smoother than those of the linear function. Therefore, the multi-joint robot main body can more smoothly be operated.

The present invention has been described above with reference to the above first to fifth embodiments, but the present invention is not limited to these embodiments. Examples of a driving unit include a servo motor and a linear motor, and additionally include a piezo-actuator and a cylinder which uses an air pressure. On the other hand, it is possible to apply various types of sensors including an encoder and a displacement gauge for measuring a rotation angle of a motor, a camera and a force detecting load cell.

This application claims the benefit of Japanese Patent Application No. 2010-248187, filed Nov. 5, 2010, which is hereby incorporated by reference herein in its entirety.

What is claimed is:

1. A robot controlling device which outputs a command value of a joint angle to each of a plurality of driving units which drive joints of a multi joint robot main body, to control driving operations of the respective driving units, the robot controlling device comprising:
    a shared memory; and
    a first processing unit and a second processing unit accessibly connected to the shared memory,
    wherein the first processing unit performs track calculation processing which includes calculating operation command data indicating a series of command values to be output to the respective driving units, on the basis of a command to operate the multi-joint robot main body to a desired position posture, and storing the operation command data as calculation results in the shared memory; and
    the second processing unit performs synchronous processing which includes acquiring the operation command data stored in the shared memory, and synchronously outputting the command values to the respective driving units at predetermined time intervals,
    wherein the shared memory stores commands each including:
    an operation describing portion where the command to operate the multi-joint robot main body to the desired position posture is described;
    a calculation start condition describing portion where calculation start conditions to calculate the operation command data on the basis of the command described in the operation describing portion are described; and
    an operation start condition describing portion where operation start conditions to operate the respective driving units are described,
    wherein the first processing unit comprises:
    a calculation start condition determining unit which refers to the calculation start condition describing portion of each of the commands stored in the shared memory and acquires, from the shared memory, the command described in the operation describing portion of the command satisfying the calculation start conditions; and
    a calculating unit which calculates the operation command data on the basis of the command acquired by the calculation start condition determining unit, to store the operation command data in the shared memory;
    wherein the second processing unit comprises:
    an operation start condition determining unit which refers to the operation start condition describing portion of each of the commands stored in the shared memory and acquires, from the shared memory, the operation command data corresponding to the command satisfying the operation start conditions among pieces of the operation command data stored in the shared memory; and
    a transmitting unit which acquires the command value corresponding to each of the driving units from the operation command data acquired by the operation start condition determining unit, to synchronously output the command values to the respective driving units at predetermined time intervals.

2. The robot controlling device according to claim 1, wherein the second processing unit comprises:
    a buffer unit including tracks corresponding to the driving units, respectively;
    a buffer writing unit which continuously writes the command values of the operation command data acquired by the operation start condition determining unit in the track corresponding to each of the driving units in order of time series; and
    a buffer reading unit which reads the command values to be output at the same time from the respective tracks of the buffer unit.

3. The robot controlling device according to claim 1, wherein the calculating unit omits the calculation in a case where it is determined that the operation command data calculated on the basis of the command acquired by the calculation start condition determining unit matches the operation command data stored in the shared memory.

4. The robot controlling device according to claim 3, wherein the operation start condition determining unit calculates a difference between the last command value of the operation command data previously acquired from the shared memory and the first command value of the operation command data presently acquired from the shared memory, and adds an offset value which gradually decreases from the difference as an initial value to zero, to the command value in order of time series from the first command value of the operation command data presently acquired from the shared memory, to correct the command value.

5. The robot controlling device according to claim 1, wherein the second processing unit comprises a robot state monitoring unit which monitors the posture of the multi joint robot main body,
    the calculating unit calculates the operation command data by use of an inverse kinematic model, and
    the robot state monitoring unit calculates the position posture of the multi-joint robot main body by use of a forward kinematic model.

6. The robot controlling device according to claim 1, further comprising:
a sensor which detects the state of the multi joint robot main body,
wherein the second processing unit comprises a command value correcting unit which corrects the command value of the operation command data acquired by the operation start condition determining unit, by use of the detection result of the sensor.

7. A robot controlling device which outputs a command value of a joint angle to each of a plurality of driving units which drive joints of a multi joint robot main body, to control driving operations of the respective driving units, the robot controlling device comprising:
a shared memory; and
a first processing unit and a second processing unit accessibly connected to the shared memory,
wherein the first processing unit performs track calculation processing which includes calculating operation command data indicating a series of command values to be output to the respective driving units, on the basis of a command to operate the multi-joint robot main body to a desired position posture, and storing the operation command data as calculation results in the shared memory; and
the second processing unit performs synchronous processing which includes acquiring the operation command data stored in the shared memory, and synchronously outputting the command values to the respective driving units at predetermined time intervals,
wherein the shared memory stores commands each including:
an operation describing portion where the command to operate the multi-joint robot main body to the desired position posture is described;
a calculation start condition describing portion where calculation start conditions to calculate the operation command data on the basis of the command described in the operation describing portion are described;
an operation start condition describing portion where operation start conditions to operate the respective driving units are described; and
a state variable which indicates at least one of a calculation start waiting state, a calculating state, a calculation completing state and an operating state,
wherein the first processing unit comprises:
a calculation start condition determining unit which refers to the calculation start condition describing portion of each of the commands stored in the shared memory and acquires, from the shared memory, the command described in the operation describing portion of the command satisfying the calculation start conditions and having the state variable indicating the calculation start waiting state;
a first state variable changing unit which changes, to the calculating state, the state variable of the command acquired from the commands stored in the shared memory by the calculation start condition determining unit;
a calculating unit which calculates the operation command data on the basis of the command acquired by the calculation start condition determining unit, to store the operation command data in the shared memory; and
a second state variable changing unit which changes, to the calculation completing state, the state variable of the command corresponding to the operation command data completed to be calculated by the calculating unit among the commands stored in the shared memory,
wherein the second processing unit comprises:
an operation start condition determining unit which refers to the operation start condition describing portion of each of the commands stored in the shared memory and acquires, from the shared memory, the operation command data corresponding to the command satisfying the operation start conditions and having the state variable indicating the calculation completing state among the pieces of operation command data stored in the shared memory;
a third state variable changing unit which changes, to the operating state, the state variable of the command corresponding to the operation command data acquired from the commands stored in the shared memory by the operation start condition determining unit; and
a transmitting unit which acquires the command value corresponding to each of the driving units from the operation command data acquired by the operation start condition determining unit, to synchronously output the command values to the respective driving units at predetermined time intervals.

* * * * *